United States Patent [19]

Gayte

[11] 4,042,717
[45] Aug. 16, 1977

[54] FREEZING RICE

[76] Inventor: Michel Gayte, 6, rue des Tournelles, 75004 Paris, France

[21] Appl. No.: 570,459

[22] Filed: Apr. 22, 1975

[30] Foreign Application Priority Data

Apr. 23, 1974 France .................. 74.13983

[51] Int. Cl.² ........................... A23B 7/04
[52] U.S. Cl. ...................... 426/508; 426/524
[58] Field of Search ......... 426/524, 462, 619, 450, 426/465, 384, 620, 444, 508

[56] References Cited

U.S. PATENT DOCUMENTS 2,813,796  11/1957  Keneaster et al. ................ 426/444
3,188,750  6/1965  Davis et al. ...................... 426/384
3,189,461  6/1965  Ozai-Durrani .................... 426/462

Primary Examiner—Joseph M. Golian
Attorney, Agent, or Firm—Michael J. Striker

[57] ABSTRACT

A food product containing starch such as extruded paste, rice grains or like fragments and particles is subjected to a treatment by a method comprising the successive steps of hydration and cooking, initial quick-freezing of grain peripheries so as to cause surface dehydration, defreezing by natural heat transfer from the center to the surface of the grains or kernels, separation of grains by mechanical milling followed by final quick-freezing right through the grains on a fluidized bed.

2 Claims, 2 Drawing Figures

FREEZING RICE

This invention relates to food products in grains, fragments or other particles which contain starch and can consist of rice or extruded-paste foods. The preparation of these latter for consumption gives rise to difficulties and this is particularly true in the case of rice. It is in fact necessary to supervise the cooking and to regulate the quantity of water employed in order to prevent the grains or fragments from adhering to each other by reason of the presence of starch.

Moreover, cooking times are particularly long in the case of rice and this is also one of the reasons why the consumption of rice is low in developed countries.

Many studies have been made and various methods of treatment have been proposed for reducing the cooking time while homogenizing rice. A further object of these studies and methods was to prevent the grains of rice from adhering to each other as a result of cooking.

However, the solutions proposed up to the present time essentially consist in carrying out a preliminary treatment and usually precooking of rice in order to reduce the final subsequent cooking operation. It nevertheless remains necessary to supervise this operation and to regulate the addition of water. In spite of the advantages offered by rice which has been treated in this manner, the difficulties which still remain are of a nature to discourage users.

The object of the present invention is accordingly to provide a food product of this type in a form in which it can be prepared for consumption both very easily and in a very short time of the order of 10 to 30 seconds, for example.

This product such as rice or extruded-paste food is presented in the form of grains or fragments which are quick-frozen after cooking and hydration, which retain their individuality and which exhibit partial dehydration at their periphery. Thus, in order to consume this product, it can be defrozen simply by passing it under a stream of hot water at a temperature of about 70°, for example. However, it is possible to adopt any other method of defreezing such as the addition of a sauce which has previously been heated since hydration of this product is unnecessary. It can therefore be consumed without any preparation other than the addition of a condiment or sauce if so desired.

The present invention is also directed to a method of treatment of a food product of the type recalled in the foregoing in order to obtain this product in the quick-frozen state. Said method is essentially distinguished by the fact that the product to be processed is subjected to the following successive operations:
  hydration and cooking which are carried out either simultaneously or separately,
  partial dehydration at the periphery and separation of the grains or fragments of the product,
  quick-freezing on a fluidized bed unless said product has already been quick-frozen so as to produce partial dehydration and unless the quick-freezing process has been followed by defreezing.

In fact, partial dehydration at the periphery is preferably carried out by quick-freezing which makes it possible to reduce the weight by approximately 5%. In this case, the separation of the grains or fragments can be carried out by defreezing. In an alternative mode of execution, however, this separation can be obtained by means of a mechanical treatment, in which case it is not necessary to defreeze the product, thus dispensing with the need for a second quick-freezing operation.

Initial hydration of the product is not carried to completion. In fact, this operation is stopped shortly before completion in order to ensure that the absorption of water does not exceed a predetermined limit so as to ensure that the treated product retains a certain resistance to crushing.

The cooking operation which results in the hydration just mentioned or is carried out separately can advantageously be performed at a temperature below approximately 60° C in order to prevent gelatinization of the starch. In the case of rice, however, the cooking times depend on the varieties of rice employed. It may be noted in this connection that, if so desired, use can be made of pretreated rice which has been subjected to a precooking operation.

This invention is also directed to an installation which is specially designed for the application of a particular embodiment of the method in accordance with the invention. Two examples of application of the method in accordance with the invention are described hereinafter with reference to the accompanying drawings, in which.

Figure 1:
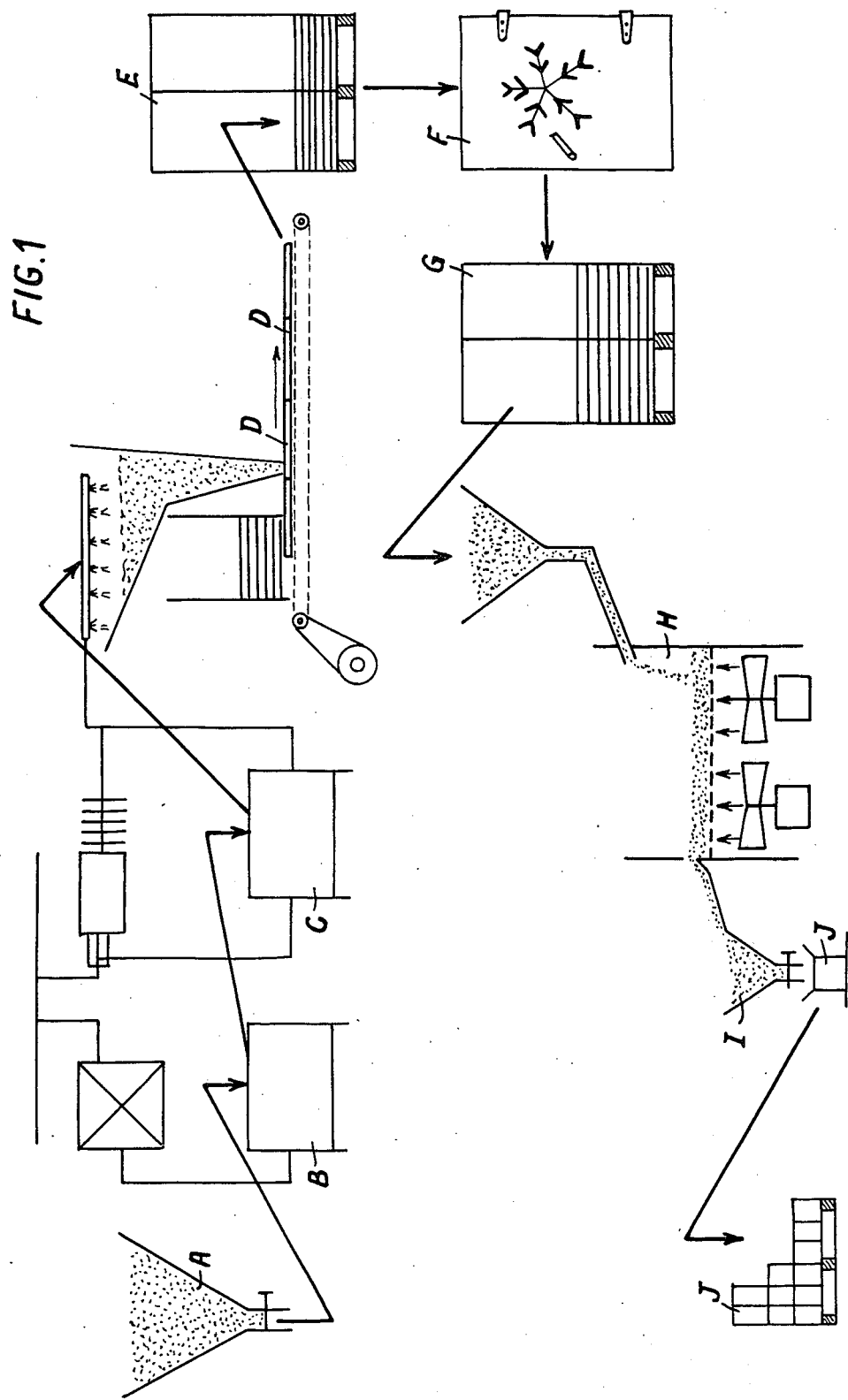
FIG. 1 is a diagram of a first embodiment of the method under consideration.

It will be assumed by way of example that the rice to be processed consists of pretreated long-grain Camargue rice which has undergone a precooking operation. Thus in the first embodiment illustrated in FIG. 1, the rice to be processed is supplied from a feed-hopper A and initially subjected to a cooking operation which is carried out by immersing the rice for a period of 10 minutes in a tank B containing boiling water. This accordingly ensures hydration of the grains of rice. However, this operation is stopped so as to ensure that the absorption of water does not exceed a predetermined limit which, in the case of this variety of rice, is 130 g of water in respect of 100 g of rice prior to cooking.

The rice is then removed from the tank and immediately immersed within another tank C in a stream of cold water at a temperature in the range of 5° to 15° C. After the actual temperature of the rice has been reduced to a value within the range of 10° to 20° C (for example 15° C), the rice is allowed to drip for a period of 15 to 30 minutes on grids D which will subsequently serve for the quick-freezing operation. The depth of rice placed on said grids can vary between 3 and 8 mm. However, said depth is preferably 5 mm in the case of long grains and slightly smaller in the case of round grains.

After dripping and temporary storage if necessary at the station E, the rice which is placed on the grids D aforesaid is introduced into a quick-freezing chamber F, the temperature within said chamber being in the range of -20° to -30° C. The rice is allowed to remain within the chamber for a period of 13 hours to 18 hours while ensuring a circulation of air at a rate of 1 m/second, for example, and a degree of relative humidity which is lower than 90%. This quick-freezing operation makes it possible to obtain partial dehydration of the rice grains at their periphery. This results in a weight loss of the order of 4 to 5%.

After this treatment, the rice grains are defrozen at the station G at room temperature for a period of 2 to 4 hours, for example. The grains of the rice which is then obtained are dehydrated at their periphery and have retained their individuality.

Said grains are then passed into a fluidized-bed quick-freezing unit H. This unit makes it possible to obtain a quick-frozen cooked rice of granular appearance in which the grains are wholly independent from each other. A quick-freezing unit of this type permits a production of one metric ton per hour or more.

However, this second quick-freezing operation must be performed very rapidly in order to prevent destruction of the surface layer. The operation is usually performed at a temperature of -30° C and for a period of the order of one minute.

At the outlet of the quick-freezing unit, the rice which has thus been treated is immediately wrapped at the station I, for example in sealed packages J.

At the time of consumption, the appearance, texture and taste of these grains of rice are the same as those of freshly cooked rice. As has already been mentioned, it is then only necessary to heat this rice by passing it under a stream of hot water or by adding a sauce which has been previously heated. The rice is then ready for instant consumption without requiring any further operations and especially without any need for either additional cooking or hydration.

This method of preparation applies to all varieties of rice and the only difference between varieties will lie in the cooking. During this preparation, it is clearly possible to add vitamins or else substances which are intended to stabilize the moisture content or antioxidant agents.

The table given below is intended to show the extent of losses in weight or rice at the time of initial dehydration at the periphery of the grains as a function of the thickness of the product and of time.

As can be noted from this table, an increased air velocity reduces the dehydration time and similarly results in a lower moisture content.

|  | depth of quick-freezing on grid | % weight loss in | | |
| --- | --- | --- | --- | --- |
|  |  | 15 h | 24 h | 15 days |
| Air velocity 0.2 m/s | 6 cm |  | 1.5% | 1.7% |
|  | 1.5 cm |  | 2.5% |  |
| Temperature − 20° | 1 cm |  | 2.8% | 10% |
|  | 0.5 cm | 4.9% | 6% | 15% |
| Moisture content: | 0.3 cm | 5.1% | 6.6% | 20% |
| 90% | 0.5 cm in tray | 2.1% | 3% |  |

The method of treatment in accordance with the invention makes it possible to produce quick-frozen rice in granular form in which the grains are cooked both internally and at the periphery. This rice is ready for immediate consumption.

Figure 2:
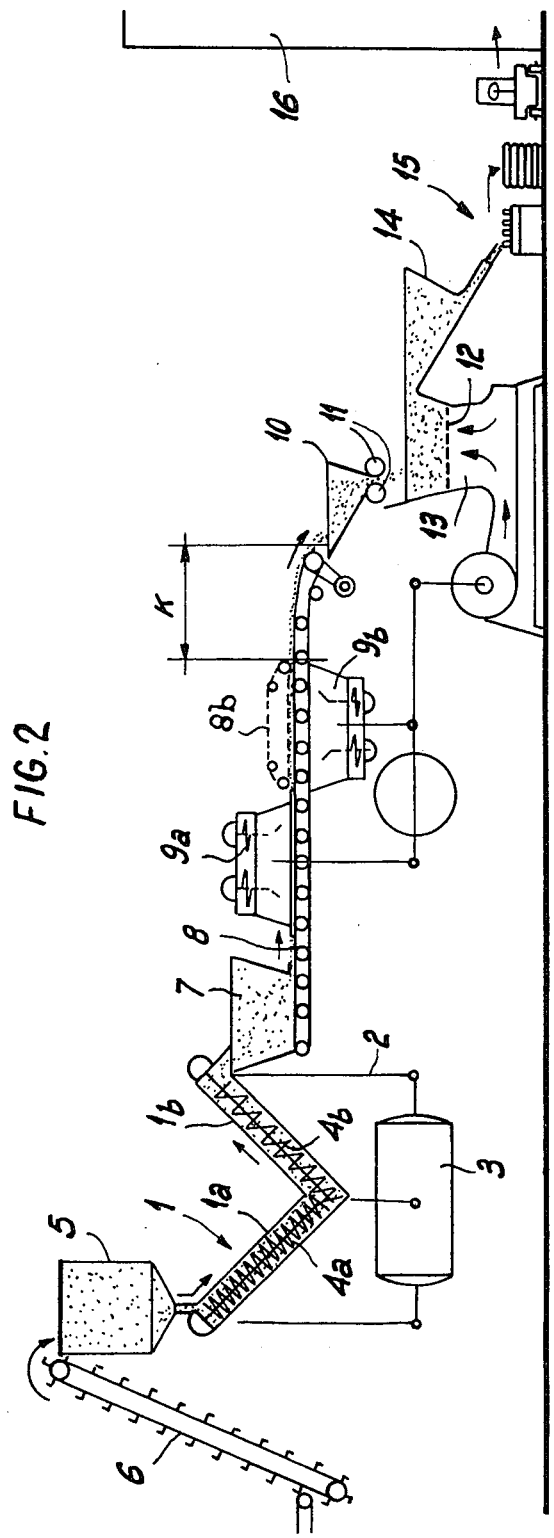
FIG. 2 is a diagram of an installation designed for a second embodiment of the method in accordance with the invention.

In the embodiment which is illustrated in FIG. 2, the preparation of the rice is carried out in a continuous process. To this end, the installation shown in FIG. 2 comprises in the first place a cooking unit 1 in which the treated product moves continuously throughout the treatment. This unit can consist of a tunnel containing a worm conveyor or auger. This tunnel in fact comprises two branches 1a and 1b which are arranged in a V in a vertical plane. A cooking bath is maintained within the interior of said branches by means of a circulation of hot water supplied by a circuit 2 comprising a boiler 3. The two branches 1a and 1b of the tunnel each contain a worm section 4a and 4b respectively which displaces the product from one end of the tunnel to the other during the cooking process.

The product to be cooked can be supplied by a conveyor 6 to a feed-hopper 5 from which it is directed to the upper extremity of the branch 1a of the tunnel unit.

The cooked product such as rice, for example, is discharged from the upper extremity of the branch 4b of the cooking tunnel and is poured into a hopper 7 which opens onto a conveyor 8 of the perforated belt type.

The hot rice is then spread over the conveyor belt in a layer having a maximum thickness of 5 mm in the case of long-grain rice.

Peripheral dehydration of the rice by surface quick freezing is carried out while the cooked rice which is still in the hot state is being carried on the conveyor 8. With this objective, provision is made downstream of the hopper 7 for a peripheral quick-freezing station comprising two units 9a and 9b which are so designed as to direct a stream of cold air onto both faces of the rice grains. In fact, these units are disposed respectively opposite to each face of the conveyor 8 so that each unit directs a rapid flow of air onto the corresponding face of the layer of rice. By way of example, said flow has a velocity of 10 meters per second, a temperature of -30° C and a relative humidity below 90%, the total time of transfer of the rice grains opposite to the quick-freezing units being less than 2 minutes.

In view of the fact that the second unit 9b produces a stream of cold air which is directed upwards onto the layer of rice grains, this might be liable to cause said grains to be lifted from the conveyor belt 8 and scattered about this latter. However, in order to circumvent this disadvantage, provision is made at this point for a device which serves to retain the grains of rice. This device can consist of an endless belt 8b which is placed above the layer of rice grains.

By directing a stream of cold air onto each face of the rice layer, there can first be obtained a rapid cooling of the periphery of the rice grains followed by quick-freezing of a very thin layer of said grains and consequently a peripheral dehydration of the rice under the desired conditions.

However, the short time of transfer of the rice grains opposite to the cold-air blowing units 9a and 9b prevents cooling of the grains to the center. As they pass out of the second unit 9b, the rice grains therefore retain a certain amount of heat within the kernels. From this moment, there consequently takes place a diffusion of internal heat from the rice kernels towards the exterior, thus resulting in a substantial reduction of the bonds existing between the grains.

Under these conditions, although the rice grains are always quick-frozen at their periphery, they can very readily be separated by simple mechanical action.

To this end, the conveyor 8 terminates above a second hopper 10, the opening of which is located above a mechanical milling machine. This machine comprises two rollers 11 between which the grains of rice are passed and thus milled.

However, in accordance with an important feature, the conveyor 8 has a zone K between the peripheral quick-freeze station and the milling station, the length of said zone being calculated so as to ensure that, as explained earlier, heat transfer takes place between the kernels which are still in the hot state and the surface of the rice grains as these latter pass through said zone K in order to facilitate subsequent detachment of the rice grains during milling in the machine 11. However, the length of the zone K provided at the end of the conveyor 8 must not be too great in order to ensure that the grains are not softened as a result of heat transfer from the hot inner kernel to the periphery. In fact, excessive softening of the grains would interfere with the mechanical milling of these latter.

At the outlet of the milling machine 11, the grains, fall onto the perforated tray 12 of a fluidized-bed quick-freeze unit 13 which produces a stream of cold air beneath said tray. By means of said unit, the grains of rice are thus quick-frozen right through.

The treatment operation just described is the final step of the method under consideration. After this operation, the grains are in fact discharged through a hopper 14 towards a packing station for storage in a chamber 16 which is cooled to a suitable temperature, for example to -18° C.

This particular form of application of the method according to the invention permits continuous processing of rice grains without any interruption of feed. This accordingly dispenses with the handling operations which are necessary in the case of the embodiments described in the main patent, thus resulting in a substantial saving of time and in appreciable economy. It should be noted in this connection that an installation of the type shown in the accompanying drawings makes it possible to process 4 to 5 metric tons of rice per day with a maximum operating staff of eight persons.

It nevertheless remains wholly apparent that the installation as thus illustrated constitutes only one example of continuous process installations which can be employed for the practical application of this method. As has already been mentioned, the method and the installation in accordance with the invention are also applicable to food products other than rice which contain starch and are supplied in the form of grains, fragments or other particles. Such food products can consist in particular of extruded-paste foods. In fact, although the problem of cooking these latter is less difficult than in the case of rice, it is nevertheless true to state that the method of treatment in accordance with the invention makes it possible to obtain quick-frozen cooked paste foods which have the advantage of being ready for immediate consumption.

What is claimed is:
1. A method of processing rice grains comprising the steps of sequentially:
   a. cooking said rice grains in water to cook and hydrate the interior cores and exterior peripheries of said grains;
   b. directing a current of gas at a temperature below 0° C at the hydrated rice grains for a time only sufficient to freeze and dehydrate said exterior peripheries of said grains and thereby reduce the weight of said grains by approximately 5%;
   c. mechanically shelling the partially dehydrated grains to separate same; and
   d. freezing the separated grains completely so that both the dehydrated peripheries and hydrated cores are frozen.
2. The method defined in claim 1 wherein during the cooking of step (a) said interior cores are heated, said method further comprising the step after step (b) and before step (d) of transferring heat from the warm cores of said grains to the frozen peripheries thereof.

* * * * *